United States Patent [19]

Tsumura et al.

[11] Patent Number: 5,077,742
[45] Date of Patent: Dec. 31, 1991

[54] ERROR-CORRECTED FACSIMILE COMMUNICATION CONTROL SYSTEM

[75] Inventors: Naoki Tsumura, Yokohama; Shigetaka Tanaka, Atsugi; Takeshi Ukegawa, Hadano, all of Japan

[73] Assignee: Ricoh Company, Ltd., Tokyo, Japan

[21] Appl. No.: 630,755

[22] Filed: Dec. 21, 1990

Related U.S. Application Data

[63] Continuation of Ser. No. 295,534, Jan. 11, 1989, abandoned.

[30] Foreign Application Priority Data

| Jan. 11, 1988 | [JP] | Japan | 63-2483 |
| Jan. 11, 1988 | [JP] | Japan | 63-2484 |
| Jan. 14, 1988 | [JP] | Japan | 63-4830 |
| Jan. 25, 1988 | [JP] | Japan | 63-12629 |
| Oct. 7, 1988 | [JP] | Japan | 63-25211 |

[51] Int. Cl.$^5$ .............................................. G08C 25/02
[52] U.S. Cl. .................................................... 371/32
[58] Field of Search ............... 371/32, 33; 364/239.51, 364/939.81

[56] References Cited

U.S. PATENT DOCUMENTS

| 3,824,547 | 7/1974 | Green et al. | 371/32 |
| 3,879,577 | 4/1975 | Progler | 371/32 |
| 3,979,719 | 9/1976 | Tobley et al. | 371/32 |
| 4,054,949 | 10/1977 | Takezoe | 364/900 |
| 4,149,142 | 4/1979 | Kageyama et al. | 371/32 |
| 4,622,682 | 11/1986 | Kumakura | 371/32 |
| 4,712,214 | 12/1987 | Meltzer et al. | 371/32 |
| 4,841,526 | 6/1989 | Wilson et al. | 371/32 |

Primary Examiner—Charles E. Atkinson
Attorney, Agent, or Firm—Oblon, Spivak, McClelland, Maier & Neustadt

[57] ABSTRACT

A method and apparatus for facsimile transmitting having an error retransmission function. A page of information is divided into a plurality of frames. The frames are transmitted on a block-by-block basis with each block having a predetermined number of frames. The information is received at a receiving station and checked for errors. If errors are present an indication is submitted back to the transmitting station so that the frames having errors can be retransmitted. A plurality of buffers is provided so that the first information can be transmitted from a first buffer while the next image information is being encoded and stored in a second buffer.

2 Claims, 13 Drawing Sheets

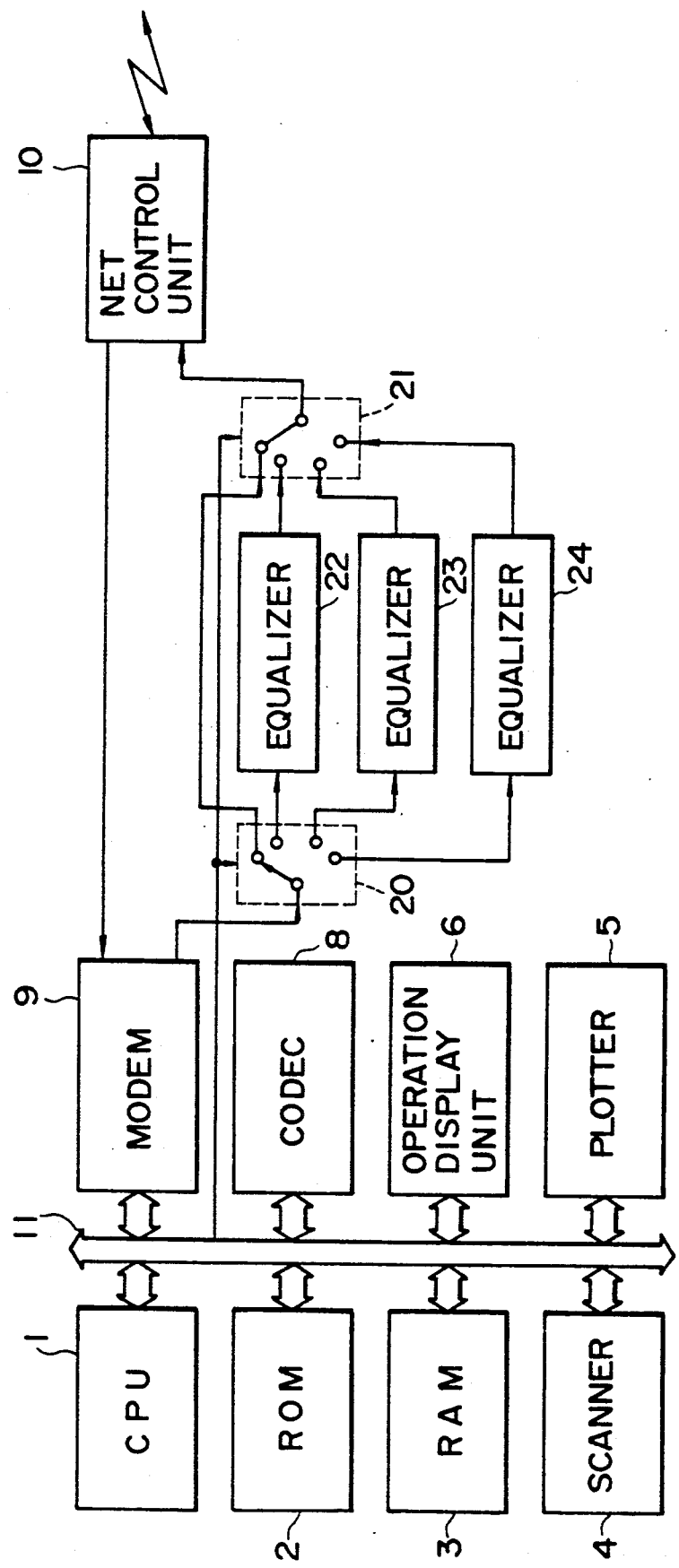

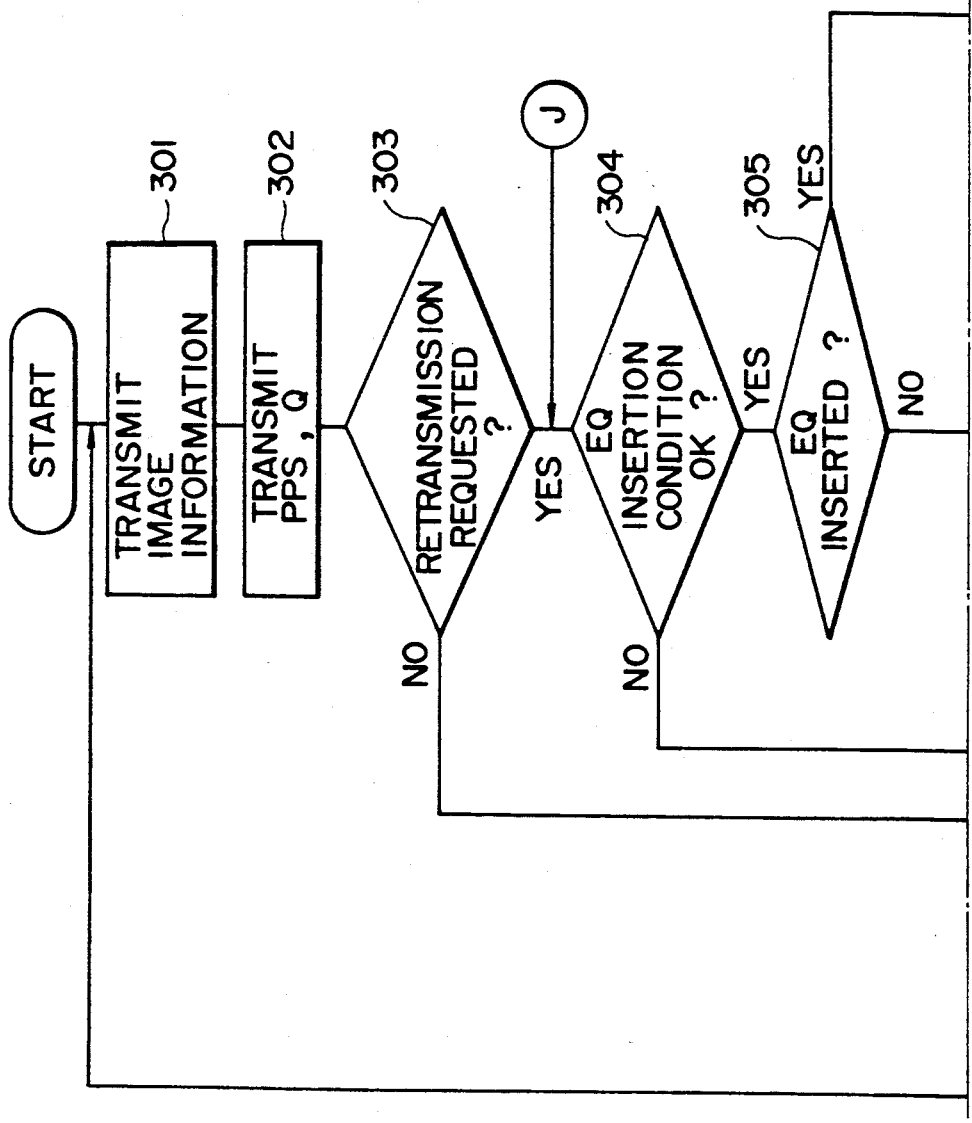

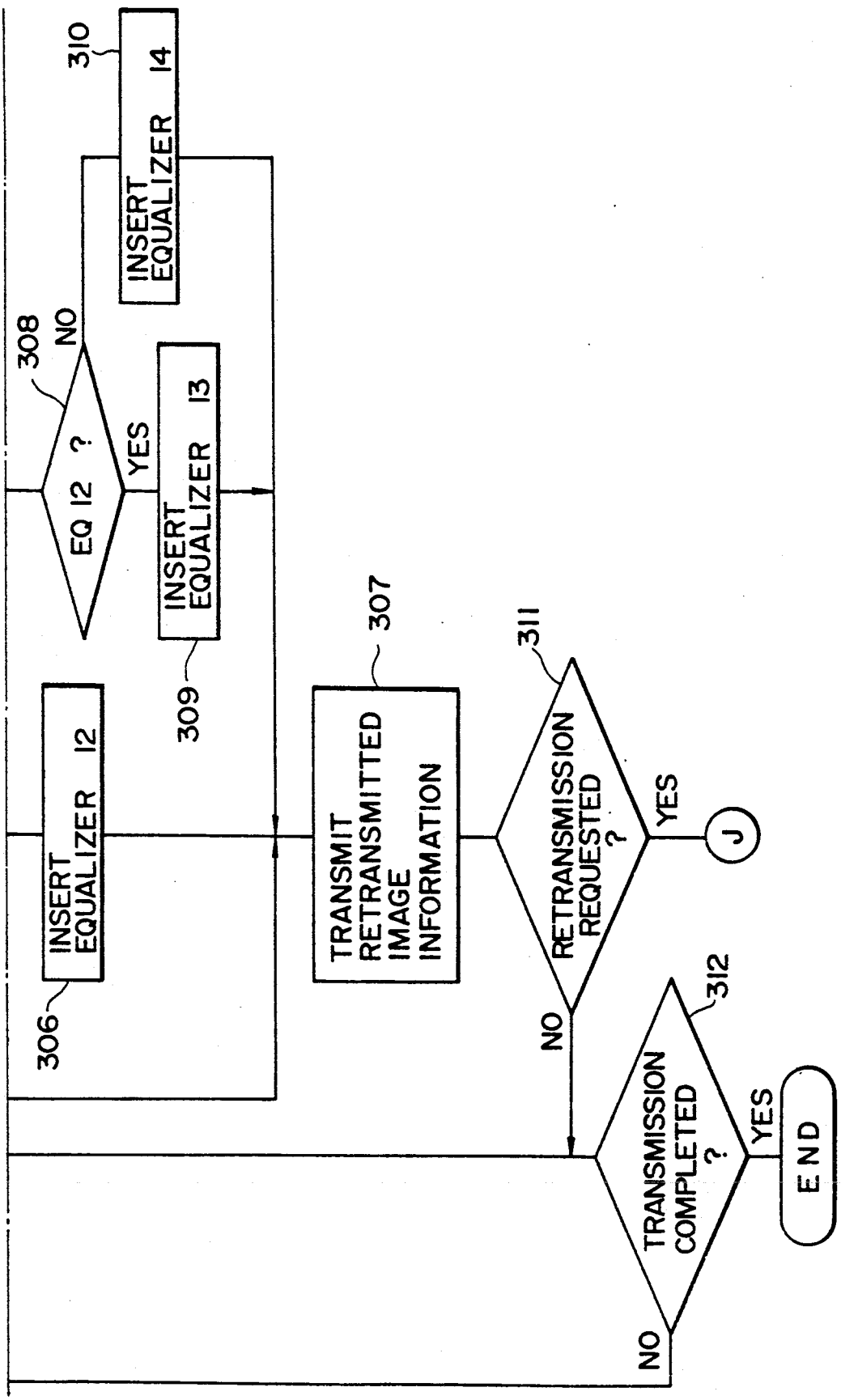

ERROR-CORRECTED FACSIMILE COMMUNICATION CONTROL SYSTEM

This application is a continuation of application Ser. No. 07/295,534, filed on Jan. 11, 1989, now abandoned.

BACKGROUND OF THE INVENTION

1. Field of the Invention

This invention generally relates to a facsimile system, and, in particular, to a facsimile communication control method and system.

2. Description of the Prior Art

When transmitting image information by a facsimile machine, if communication errors are produced in the image information received by a receiver facsimile machine, for example, due to poor network conditions, image information cannot be reproduced accurately at the receiver facsimile machine. In order to cope with such a situation, a facsimile machine provided with a unique error correction function devised by each facsimile machine manufacture has been proposed and image information can be transmitted to a receiver without errors by using such a facsimile machine. However, since such an error correction function is unique to a particular facsimile machine manufacture, such an error correction function is useless for communication between facsimile machines of different manufactures. In order to cope with this situation, there has been proposed a standard scheme of error correction mode in Recommendation T.30, which prescribes functions of Group 3 facsimile machines, by CCITT.

According to this recommendation, image information after compression by coding is divided into frames, each of which has a particular size, such as 256 bytes (octet; 1 byte (=1 octet)=8 bits) or 64 bytes, from the beginning, and one frame of image information is transmitted after having been arranged in the form of a particular frame FLM having the HDLC format as shown in FIG. 13a. The frame FLM includes a (front) flag sequence F comprised of a predetermined bit pattern, an address field A comprised of a predetermined bit pattern (global address), a control field C comprised of a bit pattern unique to a facsimile machine, an information field I, a frame check sequence FCS for error detection, and a (tail) flag F arranged in the order as mentioned. The information field I further includes a facsimile control field FCF, in which facsimile communication procedural signals are arranged, and a facsimile information field FIF, in which various information added to the facsimile communication procedural signals are arranged.

In this case, a facsimile communication procedural signal FCD (Facsimile Coded Data) is arranged in the facsimile control field FCF, and a frame number FNo indicating the order of frames and a frame data FDc, which is a coding of one frame size FSZ, are arranged in the facsimile information field FIF. Since the frame number FNo is comprised of 8-bit binary numbers, the number may extend continuously from "0" to "255" so that a continuous series of 256 frames is set as a block and it is so structured that the receiver requests retransmission on a block-by-block basis. If the image information of a single page of original cannot be transmitted in one block, another block is set for the remaining portion of the image information and the block is transmitted in succession.

When the receiver facsimile machine requests retransmission to the transmitter facsimile machine, the receiver facsimile machine transmits a frame of facsimile communication procedural signal PPR (Partial Page Request) to the transmitter facsimile machine, as shown in FIG. 13b. The facsimile communication procedural signal is transmitted with the inclusion of necessary parameters in a frame format similar to that of PPR. However, in the following description, it will be simply referred to as a signal PPR for the sake of simplicity. In this signal PPR, a bit pattern (PPR) indicating its identity to be a signal PPR is arranged in its facsimile control field FCF, and a 256-bit error map data EMp is arranged in the facsimile information field FIF.

In the error map data EMp, a data "0" is assigned to each of the frames having no transmission errors and a data "1" is assigned to each of the frames having transmission errors for the frame data in one block which has been transmitted in the order of the frames. Upon receipt of this signal PPR, the transmitter facsimile machine retransmits the frame data of each of these frames, to which the data "1" has been set in the error map data EMp, to the receiver facsimile machine. By carrying out this request for retransmission until all of the transmission errors have been cleared, the receiver can now record received image information without errors.

If the communication network or transmission path is poor, a request for retransmission may be issued repetitively for the same block. In such a case, it is extremely difficult to eliminate all of the transmission errors of frames under the same communication conditions. Under the circumstances, the following measure is recommended by the above-described Recommendations. That is, if a request for retransmission has been issued, for example, three times consecutively, the transmitter apprises the receiver of shifting down the transmission speed by one step by transmitting a signal CTC (Continue To Correct), and, if the receiver approves such a request for shift down by transmitting a procedural signal CTR (Response for CTC), the next transmission of data is carried out at a shifted down transmission speed. In this manner, transmission errors may be eliminated by suppressing errors by lowering the transmission speed.

However, according to such a prior art method, since any other conditions than the transmission speed remain unchanged before and after the shift down, the transmission errors are not suppressed sufficiently. Besides, since the transmission speed is lowered, there occurs another disadvantage of prolonged transmission speed.

SUMMARY OF THE INVENTION

In accordance with the present invention, there is provided an auxiliary equalizer for compensating the high frequency characteristic of a communication network. And, depending on the conditions for retransmission, it is determined whether or not to use such an auxiliary equalizer at least at either one of the transmitter or the receiver and to vary the characteristic of such an auxiliary equalizer. As a result, since the network characteristic is adjusted appropriately depending on the conditions for retransmission, the transmission error rate decreases significantly. Therefore, in accordance with the present invention, the frequency of request for retransmission may decrease even if the transmission speed is not lowered so that there can be obtained an enhanced transmission efficiency.

It is therefore a primary object of the present invention to obviate the disadvantages of the prior art as described above and to provide an improved facsimile communication control method and apparatus capable of reducing the image information transmission time during an error correction mode.

Another object of the present invention is to provide an improved facsimile communication control method having an improved error correction function.

A further object of the present invention is to provide an improved facsimile machine fast and reliable in operation.

Other objects, advantages and novel features of the present invention will become apparent from the following detailed description of the invention when considered in conjunction with the accompanying drawings.

BRIEF DESCRIPTION OF THE DRAWINGS

FIG. 2b is a graph showing the characteristic of an auxiliary equalizer provided in the MODEM shown in FIG. 2a;

FIG. 6 is a block diagram showing the overall structure of a facsimile machine constructed in accordance with another embodiment of the present invention;

FIG. 7 is an illustration showing how to combine FIGS. 7a and 7b;

FIGS. 7a and 7b, when combined as indicated in FIG. 7, define a flow chart showing a sequence of steps of a transmission process in the facsimile machine of FIG. 6;

DESCRIPTION OF THE PREFERRED EMBODIMENTS

Figure 1:
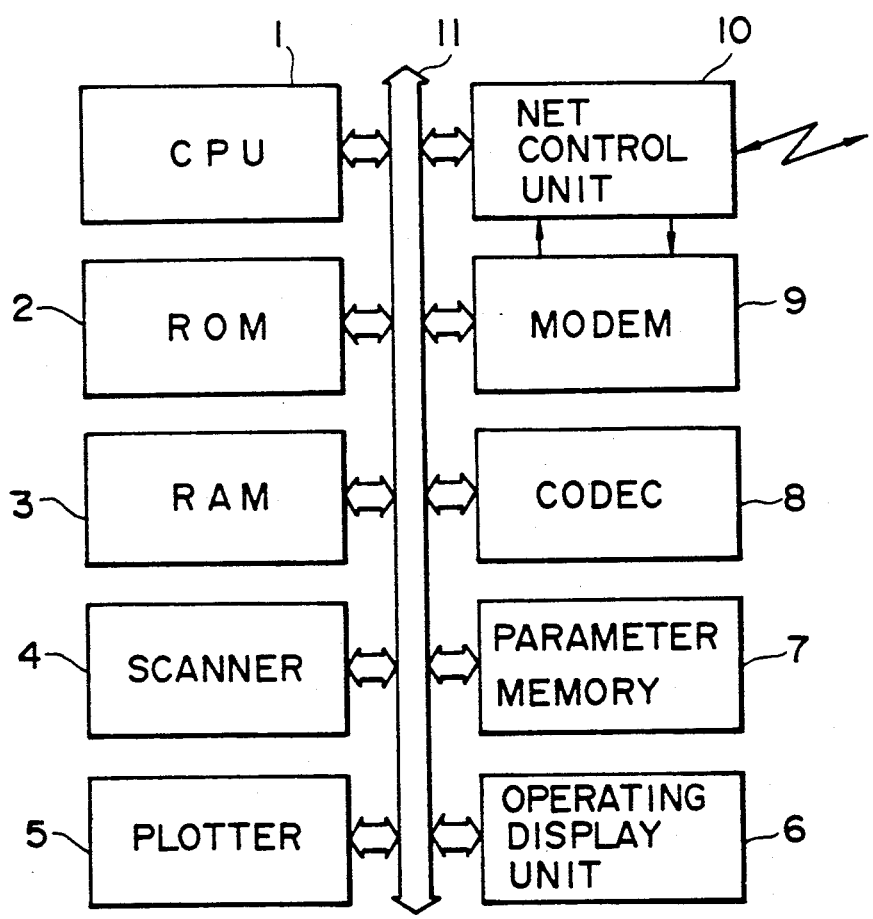
FIG. 1 is a block diagram showing the overall structure of a facsimile machine constructed in accordance with one embodiment of the present invention.

Referring now to FIG. 1, there is schematically shown in block form a facsimile machine constructed in accordance with one embodiment of the present invention. As shown, the facsimile machine includes a central processing unit or simply CPU 1 which is in charge of the overall control of the facsimile machine and of a facsimile communication control procedure. A control program to be used by the CPU 1 is stored in a read only memory or simply ROM 2. A work area and a transmission buffer are defined in a random access memory or simply RAM 3. The transmission buffer is designed to have a memory capacity of at least 64K bytes (K=1,024) so as to allow to store one block which is comprised of up to 256 frames, each having 256 bytes.

The facsimile machine also includes a scanner 4 for optically reading an original to be transmitted at a predetermined resolution and a plotter 5 for recording received image information on a sheet of recording medium at a predetermined resolution. Also provided is an operation/display unit 6 which serves as an interface between the facsimile machine and an operator so that the operator can give various operational commands to the facsimile machine through this unit 6. A parameter memory 7 is also provided for storing various parameters, such as abbreviated dial information which is uniquely set for this facsimile machine, and it is preferably comprised of a non-volatile memory device. A codec 8 is also provided for compressing image information to be transmitted by coding and for decompressing received image information by decoding to thereby restore the original image information. Also provided is a MODEM 9 which allows to use an analog communication network, such as a telephone communication network, as a transmission line by carrying out modulation and demodulation of data. A net control unit 10 serves to establish a connection between the present facsimile machine and a communication network, such as a telephone communication network. The net control unit 10 is provided with an automatic call placing and receiving function, and the transmission network is operatively coupled to the MODEM 9 through this net control unit 10. Data are exchanged among the CPU 1, ROM 2, RAM 3, scanner 4, plotter 5, operation/display unit 6, parameter memory 7, codec 8, MODEM 9 and net control unit 10 through a system bus 11.

Figure 2A:
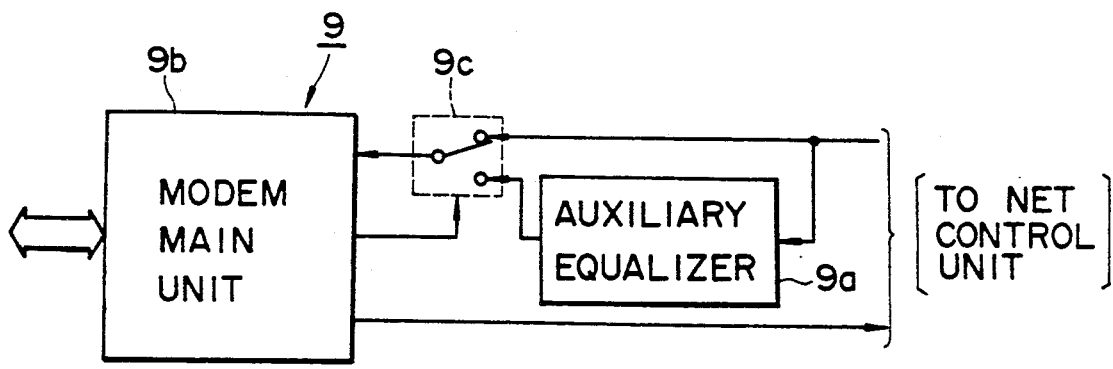
FIG. 2a is a schematic illustration showing the structure of the MODEM provided in the facsimile machine shown in FIG. 1.
Figure 2B:
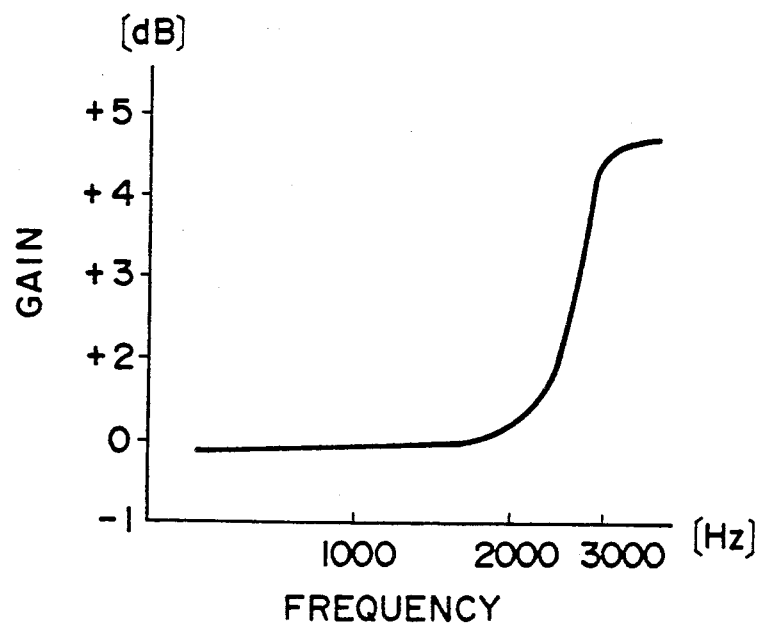

FIG. 2a illustrates the internal structure of the MODEM 9 provided in the facsimile machine shown in FIG. 1. The MODEM 9 has an operating characteristic shown in FIG. 2b and it includes an auxiliary equalizer 9a for compensating a high frequency characteristic in the transmission line at the receiver side. The MODEM 9 also includes a selector switch 9c whose status is controlled by a MODEM main unit 9b, and, thus, the use of the auxiliary equalizer 9a is determined by the status of the selector switch 9c.

In operation, with an original to be transmitted set in the scanner 4, an operator of the facsimile machine initiates a transmission operation by inputting the address information of a destination station using the operation/display unit 6. In this case, however, it is assumed that only one original has been set by the operator in the scanner 4 and the image information obtained by compressing the image data of the original by compression is less than 64K bytes so that it may be contained in one block. It is also assumed that both of the transmitting and receiving facsimile machines have the same functions as those of the facsimile machine shown in FIG. 1.

Figure 3:
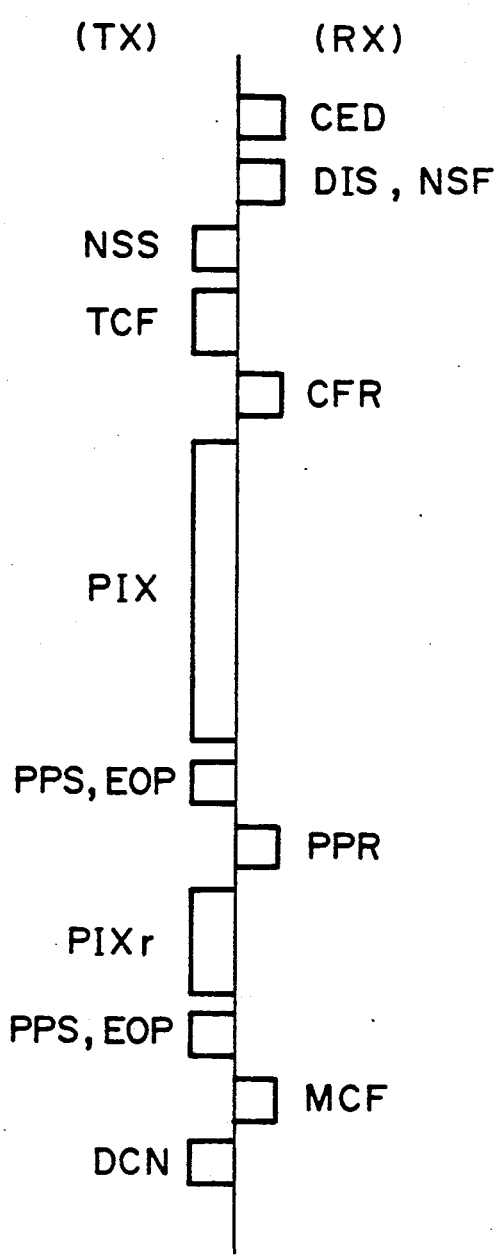
FIG. 3 is a timing chart illustrating a sequence of image transmission operation during an error correction mode in the facsimile machine of FIG. 1.

A call is placed by the transmitting facsimile machine to the receiving facsimile machine. Then, upon receipt of a call, the receiving facsimile machine sends a signal CED, which indicates the fact that the receiving facsimile machine is a non-vocal terminal, and apprises its standard functions and optional functions to the transmitting facsimile machine by way of signals DIS and NSF, as shown in FIG. 3. Then, the transmitting facsimile machine apprises functions to be used to the receiving facsimile machine by way of a signal NSS and then carries out a training check TCF. If the result of training is excellent, the receiving facsimile machine sends a signal CFR to the transmitting facsimile machine. In response thereto, the transmitting facsimile machine initiates the transmission of image information PIX.

In this case, in the transmitting facsimile machine, the image of the original to be transmitted is optically read by the scanner 4 and a resulting image signal is compressed by coding by the codec 8. The resulting compressed image information is then arranged in the form of frame data as described above and then stored in the transmission buffer defined in the RAM 3. Then, the frame data thus stored in the transmission buffer is transferred to the MODEM 9 where the frame data is modulated and then the thus modulated frame data is transmitted through the net control unit 10 to the receiving facsimile machine through a communication network. Upon completion of transmission of one page of image information PIX, a signal PPS and a signal EOP, which indicates the end of transmission, are transmitted.

On the other hand, upon receipt of transmitted image information, the receiving facsimile machine stores the received image information in the RAM 3 and checks its error detecting code FCS to see whether or not there is an error in each of the data frames. Then, as a result of examination of th frame check sequence of each of the frames, if the receiving facsimile machine finds data errors in one or more frames, the receiving facsimile machine sends a signal PPR to the transmitting facsimile machine to thereby apprise the transmitting facsimile machine of those data frames for which data errors have been found Upon receipt of signal PPR, the transmitting facsimile machine retransmits image information PIXr which is comprised of one or more data frames having the frame numbers designated by the transmitting facsimile machine and then signals PPS and EOP upon completion of such retransmission.

If the receiving facsimile machine has successfully received the image information PIXr without errors, then it sends a signal MCF to the receiving facsimile machine. Therefore, the transmitting facsimile machine confirms the fact that the transmission of image information has been properly completed and thus it sends a signal DCN to the receiving facsimile machine to disconnect it from the communication network, thereby terminating the image information transmission operation.

As described above, if the receiving facsimile machine detects the presence of errors in received image information, the receiving facsimile machine sends a request for retransmission of those frames for which errors have occurred and thus the transmitting facsimile machine retransmits only those data frames which have been requested by the receiving facsimile machine. By repeating this operation as many times as necessary, the receiving facsimile machine can reproduce an accurate image.

Figure 14:
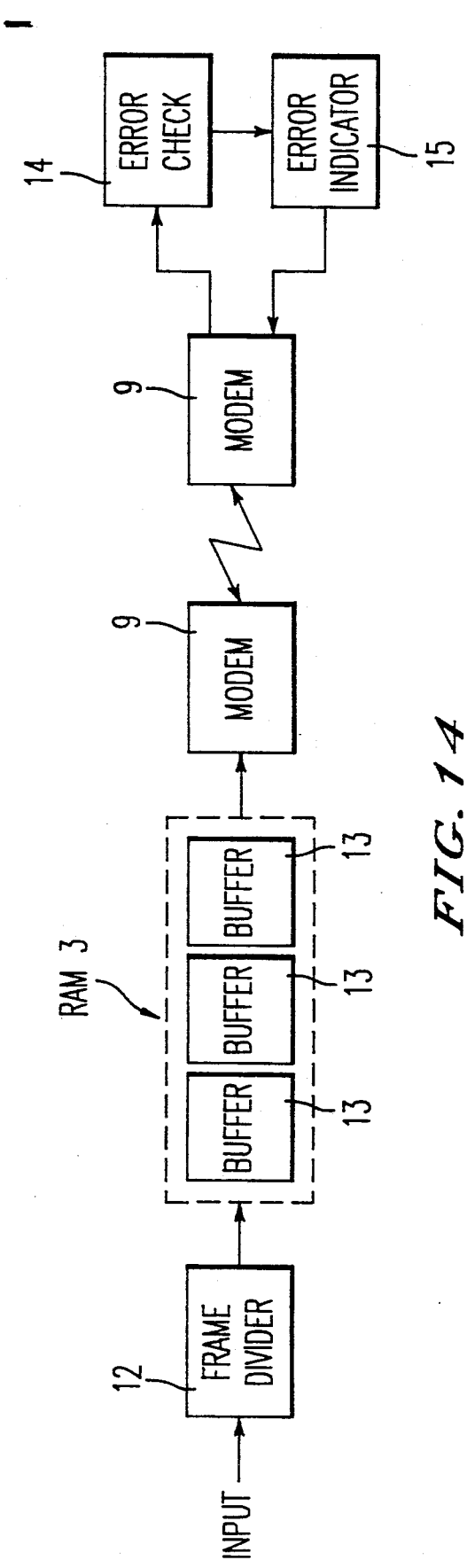
FIG. 14 is a block diagram showing in structural terms the function of the invention.

FIG. 14 illustrates in structural form the functions described above. Thus the input from the codec is received by the frame divider 12 which arranges the compressed image information in the form of frame data. This is then stored in one of the buffers 13 in RAM 3. When desired this information is then transfer to modem 9 from where it is transmitted to the receiving station. The modem 9 of the receiving station receives the transmitted frames. The data is checked by error check circuit 14. If an error is found error indicator circuit 15 receives this information and generates a signal which is transmitted back to the transmitting station by way of the modems.

If the retransmission for the same block has been carried out beyond a predetermined number of times, the transmitting facsimile machine sends a signal CTC and in response thereto the receiving facsimile machine sends a signal CTR as described previously in the section of the description of the prior art. In this case, the transmission speed for transmitting image information is shifted down to a lower transmission speed by one step. In general, in a high-speed MODEM function of MODEM 9, use is made of V.29 MODEM and V.27ter MODEM. In V.29 MODEM, the modulation speed is 2,400 baud and its standard transmission speed is 9,600 bps while a fall back speed of 7,200 bps is set when shifted down from 9,600 bps. In V.27ter MODEM, the modulation speed is 1,600 baud and its standard transmission speed is 4,800 bps while a fall back speed of 2,400 bps is set when shifted down from 4,800 bps. Thus, when shifted down from the transmission speed of 9,600 bps, the transmission speed gradually changes in the order of 7,200 bps, 4,800 bps and 2,400 bps one step at a time. A frequency band to be used differs between the V.29 MODEM and the V.27ter MODEM, and the energy distribution at both ends of the band of the transmission signal of V.29 MODEM (i.e., bands of 1 KHz or less and 2.6 KHz or more) is larger than that of the V.27ter MODEM. Thus, in the case where the amount of decay of a high frequency band of a communication network is large and thus transmission errors occur consecutively, it is often the case that the transmission errors are not sufficiently eliminated even if a shift down has been effected from 9,600 bps to 7,200 bps and it also holds true for the shift down from 4,800 bps to 2,400 bps.

Figure 4:
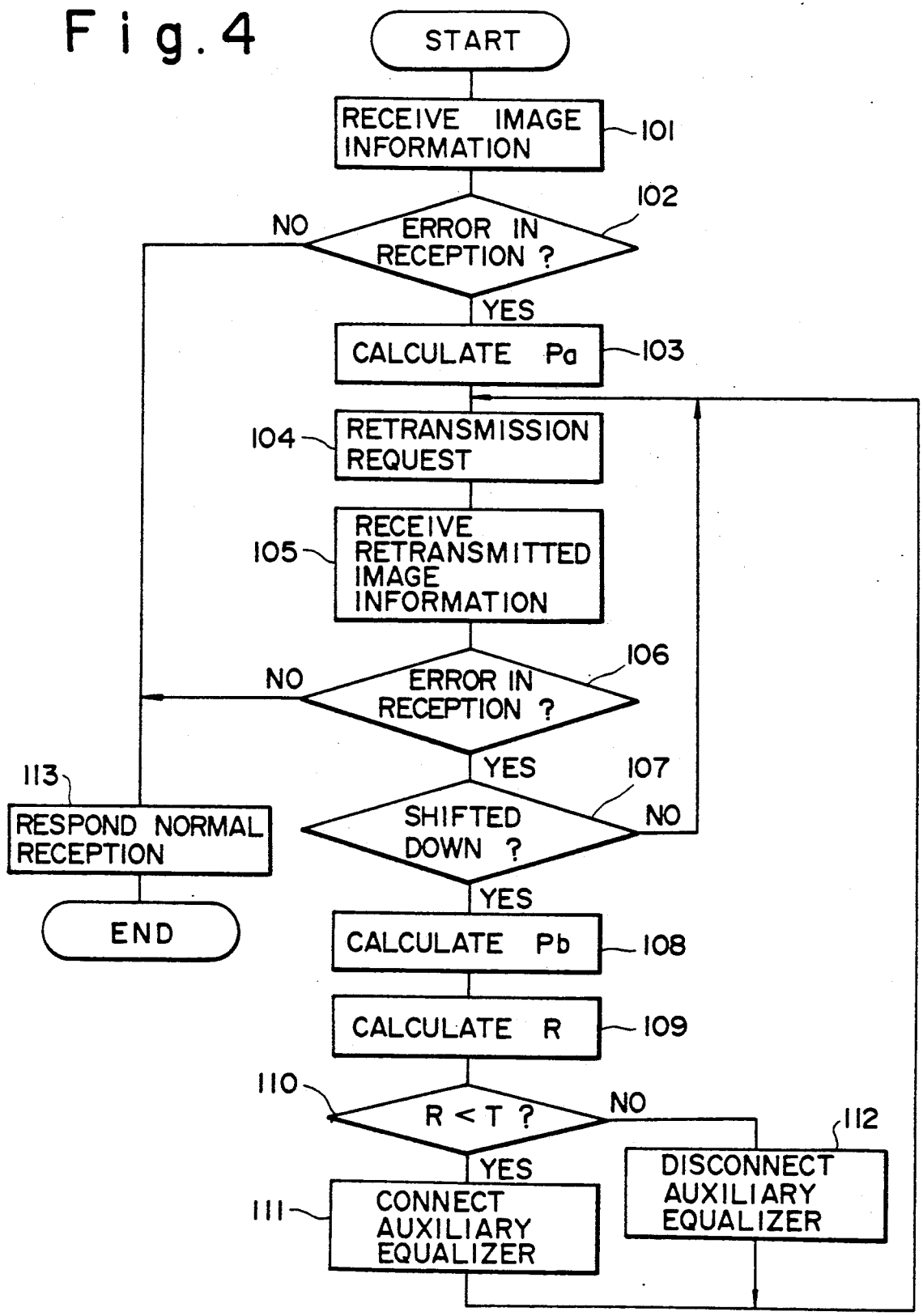
FIG. 4 is a flow chart illustrating a sequence of steps of an image information receiving process in one embodiment of the present invention.

Under the circumstances, in accordance with the present invention, if a shift down has occurred during transmission of image information during an error correction mode and yet transmission errors still occur, the degree of improvements in the occurrence of transmission errors before and after the shift down is examined, and, if the degree of improvements is not large enough, the auxiliary equalizer 9a is set in operation to effect compensation of the high frequency band, thereby allowing to enhance the degree of improvements in eliminating transmission errors. In other words, the receiving facsimile machine carries out a process as shown in FIG. 4 when receiving one block of image information.

In the first place, without using the auxiliary equalizer 9a, the image information is received (step 101) and it is checked to see whether or not transmission errors have occurred in the received data (step 102). If the result of determination at step 102 is affirmative, then a frame error rate Pa is calculated by dividing the number of frames for which transmission errors have occurred by the total number of received frames (step 103) Then, a signal PPR, which indicates the frames for which transmission errors have occurred, is sent to the transmitting facsimile machine to thereby request retransmission of those frames (step 104). In response thereto, the image information of those frames to which the transmission errors have occurred is retransmitted from the transmitting facsimile machine and the receiving facsimile machine receives this image information (step 105). During this retransmission, it is checked to see whether or not retransmission errors occur again (step 106). If the result of determination at step 106 is affirmative, then a shift down is set between the transmitting and receiving facsimile machines and then it is checked to see whether or not the image information transmission speed has already been lowered by one step (step 107). If the result of determination at step 107 is negative, then it goes back to step 104 to send another request of retransmission.

If the result of determination at step 107 is affirmative, i.e., retransmission of image information having been carried out repetitively until shift down, a frame error rate Pb after the shift down is calculated (step 108), and, then, an error improvement rate R is calculated by dividing the frame error rate Pb by the frame error rate Pa (step 109). Then, it is examined whether or not the resulting error improvement rate R is smaller than a predetermined value T (step 110). If the result of determination at step 110 is affirmative, it is the case in which no significant improvements by shift down have been attained because frame errors still occur beyond a predetermined level even if shift down has been carried out, and, therefore, an instruction is sent to the MODEM 9 to operate the selector switch 9c to set the auxiliary equalizer 9a in operation (step 111). Then, it goes back to step 104 to issue a request for retransmission.

If the result of determination at step 110 is negative, it is the case in which sufficient improvements have been obtained as a result of shift down, and, thus, it goes back to step 104 to issue a request for retransmission while maintaining the auxiliary equalizer 9a inoperative (step 112). If the result of determination at step 102 is negative and if the result of determination at step 106 is negative, a signal MCF is sent to proceed to preparation for receiving the next block of image information (step 113).

As described above, when a shift down operation has been carried out without significant removal of transmission errors in the image information, it is checked whether or not the improvement rate of the frame error rates before and after the shift down (i.e., error improvement rate R) is larger than a predetermined value T, and, if negative, it is the case in which significant effects are not produced by the shift down operation and the characteristic of the communication network has a significant deterioration in the high frequency band, so that a subsequent request of retransmission is issued under the condition that the auxiliary equalizer 9a is set operative to thereby compensate the deterioration in the high frequency band of the communication network. On the other hand, if the error improvement rate R is larger than the predetermined value T, then it indicates the fact that there has been obtained a significant improvement as a result of the shift down operation, so that a request for retransmission is again issued as it is. In this manner, an optimal image information receiving operation can be carried out depending on the conditions of the communication network and the time required for transmission of image information can be shortened. As described above, the auxiliary equalizer 9a is not used unless significant effects can be used by using the auxiliary equalizer 9a so that the auxiliary equalizer 9a can be used most effectively and the possibility of overcompensation by using the auxiliary equalizer 9a is minimized. In the above-described embodiment, it is so structured to use the auxiliary equalizer 9a at all times; however, as an alternative structure, it may also be so structured that the use or non-use condition of the auxiliary equalizer 9a is controlled depending on the conditions of retransmission, in which case the network characteristic may be always maintained to be at optimum.

Figure 5:
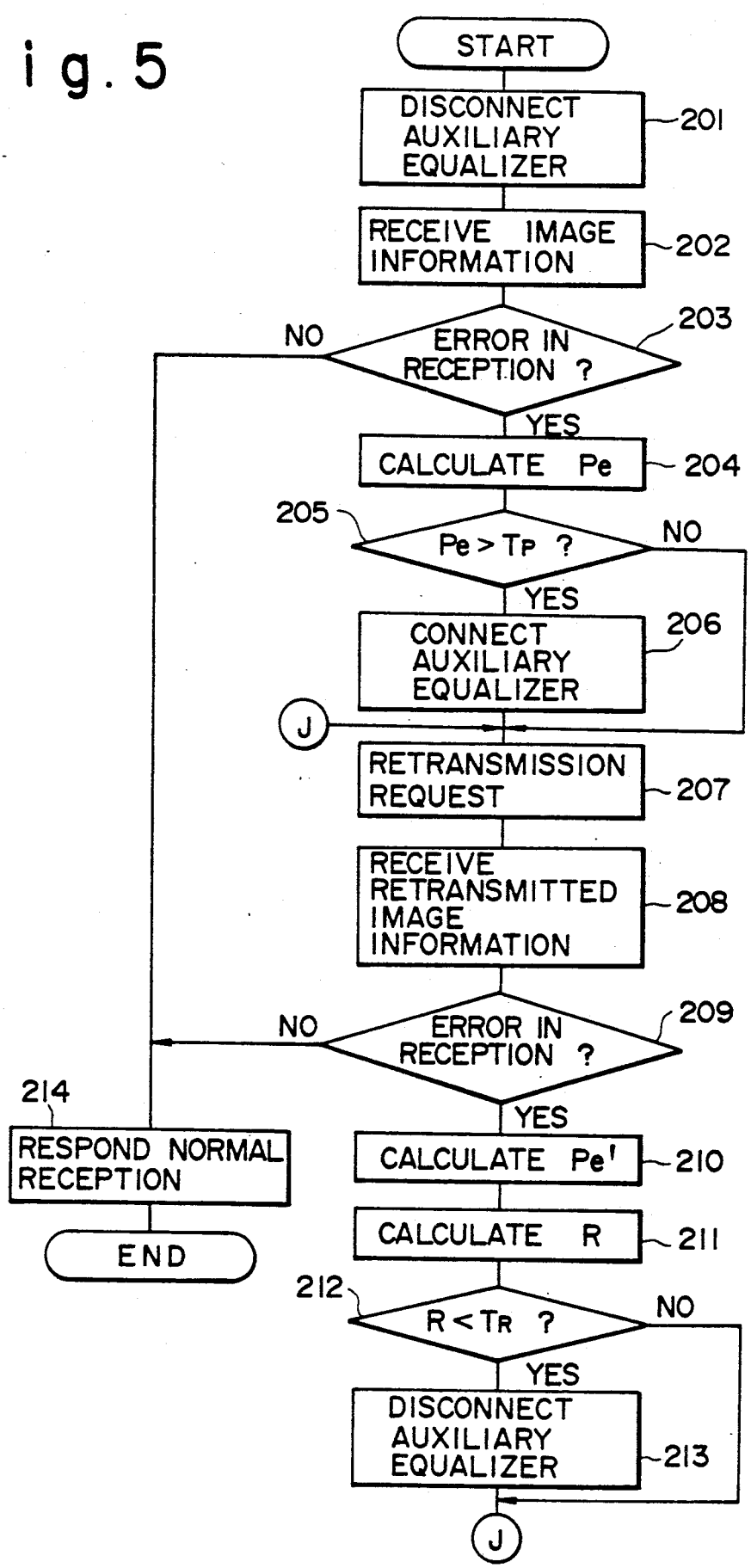
FIG. 5 is a flow chart illustrating a sequence of steps of an image information receiving process in another embodiment of the present invention.

FIG. 5 illustrates a sequence of steps in a process which is carried out by the receiving facsimile machine when receiving one block of image information in another embodiment of the present invention, In the first place, before reception of image information, the auxiliary equalizer 9a is disconnected by the selector switch 9c to be set in its non-use status (step 201). Under this condition, one block of image information is received (step 202) and it is checked whether or not errors have been detected (step 203). If errors have been detected and the result of determination at step 203 is affirmative, then an error occurrence rate Pe is calculated by dividing the number of frames for which errors have occurred by then umber of received frames (step 204), and it is checked whether or not this error occurrence rate Pe is larger than a predetermined value Tp (step 205). If the result of determination at step 205 is affirmative, then there is a possibility that errors again occur during retransmission, and, therefore, the selector switch 9c is operated to set the auxiliary equalizer 9a operative or in use status (step 206). Under this condition, a request for retransmission is sent to the transmitting facsimile machine (step 207).

On the other hand, if the result of determination at step 205 is negative, then it proceeds to step 207 to send a request for retransmission to the transmitting facsimile machine while maintaining the auxiliary equalizer 9a inoperative. When a request for retransmission is made in this manner, requested frames are retransmitted from the transmitting facsimile machine so that these retransmitted frames are received (step 208) and it is checked whether or not errors have occurred then (step 209). If the result of determination at step 209 is affirmative, an error occurrence rate Pe' is calculated by dividing the number of error occurring frames by the total number of retransmitted frames (step 210) and then an error improvement rate R is calculated by dividing the error occurrence rate Pe by the error occurrence rate Pe' (step 211).

Then, it is checked whether or not the resulting error improvement rate R is smaller than the predetermined value $T_R$ (step 212) and if the result of determination at step 212 is affirmative, it indicates the condition in which the high frequency characteristic compensating function by the auxiliary equalizer 9a is not carried out effectively, the selector switch 9c is operated to set the auxiliary equalizer 9a inoperative (step 213); whereas, if the result of determination at step 212 is negative, it indicated the condition in which the effects of the auxiliary equalizer 9a are sufficiently obtained so that it goes back to step 207 to carry out a retransmission request repetitively while maintaining the auxiliary equalizer 9a in its use status (process 213 not implemented). On the other hand, if the result of determination at step 203 is negative and the result of determination at step 204 is negative, it indicates the fact that no errors have occurred in the received image information so that a signal MCF is sent (step 214) and it proceeds to a condition for receiving the next block. It is to be noted that values $T_P$ and $T_R$ are empirically determined values.

In this manner, if errors have occurred in one or more frames of the image information which has been received for the first time, the auxiliary equalizer 9a is used if the error occurrence rate Pe is larger than the predetermined value $T_P$, and, thus, the retransmitted image information can be received with the high frequency characteristic of the network compensated, whereby the probability of occurrence of errors during retransmission can be suppressed. On the other hand, if the effects of the auxiliary equalizer 9a are not obtained sufficiently, the use of the auxiliary equalizer 9a is terminated so that the auxiliary equalizer 9a can be used effectively and advantageously.

In the above-described embodiment, an auxiliary equalizer is provided only in the transmitting side of the MODEM. Alternatively, the present invention may be equally applicable to the case in which use is made of a MODEM having an auxiliary equalizer in each of its transmitting and receiving sides. Furthermore, in the above-described embodiment, it is not so structured to cease retransmission at the transmitting facsimile machine when a request for retransmission has been issued consecutively. However, the present invention is equally applicable to the case in which retransmission is denied after repetitive implementation over a predetermined number of times. The characteristic of the auxiliary equalizer should not be limited to the one described above. And, the present invention is equally applicable to the case in which two kinds of auxiliary equalizers, i.e., one corresponding to a multi-stage link and the other corresponding to the cable length between the facsimile machine and the exchange unit, are provided.

FIG. 6 illustrates a facsimile machine constructed in accordance with a further embodiment of the present invention. It is to be noted that those elements similar to those shown in FIG. 1 are indicated by similar numerals In the structure shown in FIG. 6, a received signal input terminal is directly connected to a received signal output terminal of the net control unit 10, and a transmitting signal output terminal of the MODEM 9 and a transmitting signal input terminal of the net control unit 10 are connected to common terminals of selector switches 20 and 21 having four select terminals, respectively. The selector switches 20 and 21 have their first select terminals commonly connected and have their second, third and fourth select terminals connected through respective equalizers 22, 23 and 24 for compensating the high frequency characteristic of a communication network. The equalizers 22, 23 and 24 have different frequency characteristics. For example, the equalizer 23 has a larger degree of compensation for the high frequency band than the equalizer 22, and the equalizer 24 has a larger degree of compensation for the high frequency band than the equalizer 23.

When the selector switches 20 and 21 select the first select terminals, the transmitting signal output terminal of the MODEM 9 is directly connected to the transmitting signal input terminal of the net control unit 10. When the select switches 20 and 21 select the second, third, or fourth select terminals, the equalizer 22, 23, or 24 is inserted between the transmitting signal output terminal of the MODEM 9 and the transmitting signal input terminal of the net control unit 10, so that a transmitting signal is transmitted from the MODEM 9 under the condition in which the high frequency band of the communication network can be compensated.

With the above-described structure, FIGS. 7a and 7b define a flow chart showing a sequence of steps to be carried out by the CPU 1 when the present facsimile machine places a call to another facsimile machine and transmits image information in a procedure similar to that of FIG. 2 using an error correction mode. That is, in the first place, the select switches 20 and 21 are operated to select the first select terminals and one block of image information and a signal PPS.Q are transmitted without selecting any of the equalizers 22, 23 and 24 (steps 301 and 302). Then, it is checked whether or not a request for retransmission has been issued from the receiving facsimile machine (step 303). Then, it is checked whether or not the then existing retransmission condition satisfies the condition to insert any of the equalizers (step 304). If the equalizer insertion condition is satisfied and the result of determination at step 304 is affirmative, then it is checked whether or not any of the equalizers 22, 23 and 24 has already been in use (step 305). If none of the equalizers is in use and the result of determination at step 305 is negative, then the select switches 20 and 21 are operated to select their second select terminals to thereby have the equalizer 22 inserted in the transmission path (step 306). Under this condition, the image information comprised of the frames requested for retransmission by the receiving facsimile machine is transmitted (step 307).

If any one of the equalizers has been in use and the result of determination at step 305 is affirmative, then it is checked whether or not the equalizer currently in use is the equalizer 12 (step 308). If the result of determination at step 308 is affirmative, then the select switches 20 and 21 are operated to have their third select switches selected to have the equalizer 23 inserted in the transmission path (step 309) and then it proceeds to step 307 where the image information to be retransmitted is transmitted under the condition. If the result of determination at step 308 is negative, then the select switches 20 and 21 are operated to have their fourth select terminals selected to have the equalizer 24 inserted in the transmission path (step 130), and then it proceeds to step 307 where the image information to be retransmitted is transmitted under the condition. If the result of determination at step 304 is negative, then it proceeds to step 307 where the image information to be retransmitted is transmitted.

Then, it is checked whether or not a request for retransmission has been issued for the retransmitted image information at step 307 (step 311), and if the result of determination at step 311 is affirmative, then it goes back to step 304 to carry out any subsequent process. If the result of determination at step 303 is negative and the result of determination at step 311 is negative, then it indicates the fact that the image information then transmitted has been received properly, and, thus, it is checked whether or not there is any information block which has not been transmitted (step 312), and if the result of determination at step 312 is negative, it goes back to step 301 to transmit the next following block of image information. If the result of determination at step 312 is affirmative, then the transmission process is terminated.

The equalizer insertion condition may include such a condition as the number of retransmission operations exceeding a predetermined value, the number of retransmitted frames exceeding a predetermined value, or the retransmission frame rate exceeding a predetermined value. In this manner, it is so structured that the insertion of an equalizer into a transmission path and the selection of an equalizer to be inserted into the transmission path can be carried out depending on the retransmission condition. As a result, in the case where transmission errors have occurred because of any deterioration in the frequency characteristic of the communication network, the frequency characteristic of the communication network can be properly compensated and the generation of transmission errors can be reduced significantly. Therefore, transmission of image information can be continued without lowering the transmission speed and the frequency of requesting retransmission can be reduced, so that the communication efficiency can be enhanced remarkably.

In the above-described embodiment, each time when a predetermined equalizer insertion condition has been met, the characteristic of an equalizer to be used is switched. Alternatively, it may also be so structured to set the characteristic of an equalizer to be used depending on the number of retransmission or the number of retransmitted frames during a predetermined time period. Besides, in the above-described embodiment, it is so structured to use one of the three equalizers selectively. As an alternative structure, it may also be so structured to use these equalizers in any combination. In addition, provision may be made of any desired number of equalizers other than 3. In the above-described embodiment, the frequency characteristic of an equalizer to be inserted into the transmission path is altered by selecting one of the three equalizers having different fixed frequency characteristics. Alternatively, it may also be so structured to alter the characteristic of the equalizer to be inserted in the transmission path by using an equalizer having a variable frequency characteristic.

Moreover, in the above-described embodiment, use is made of separate equalizers. However, use may also be made of one or more equalizers built in the MODEM, in which case the manufacturing cost may be prevented from increasing. Also in the above-described embodiment, use is made of an equalizer in the transmitting side; however, the present invention is equally applicable to the case in which such an equalizer is provided in the receiving side or in each of the transmitting and receiving sides.

Figure 8:
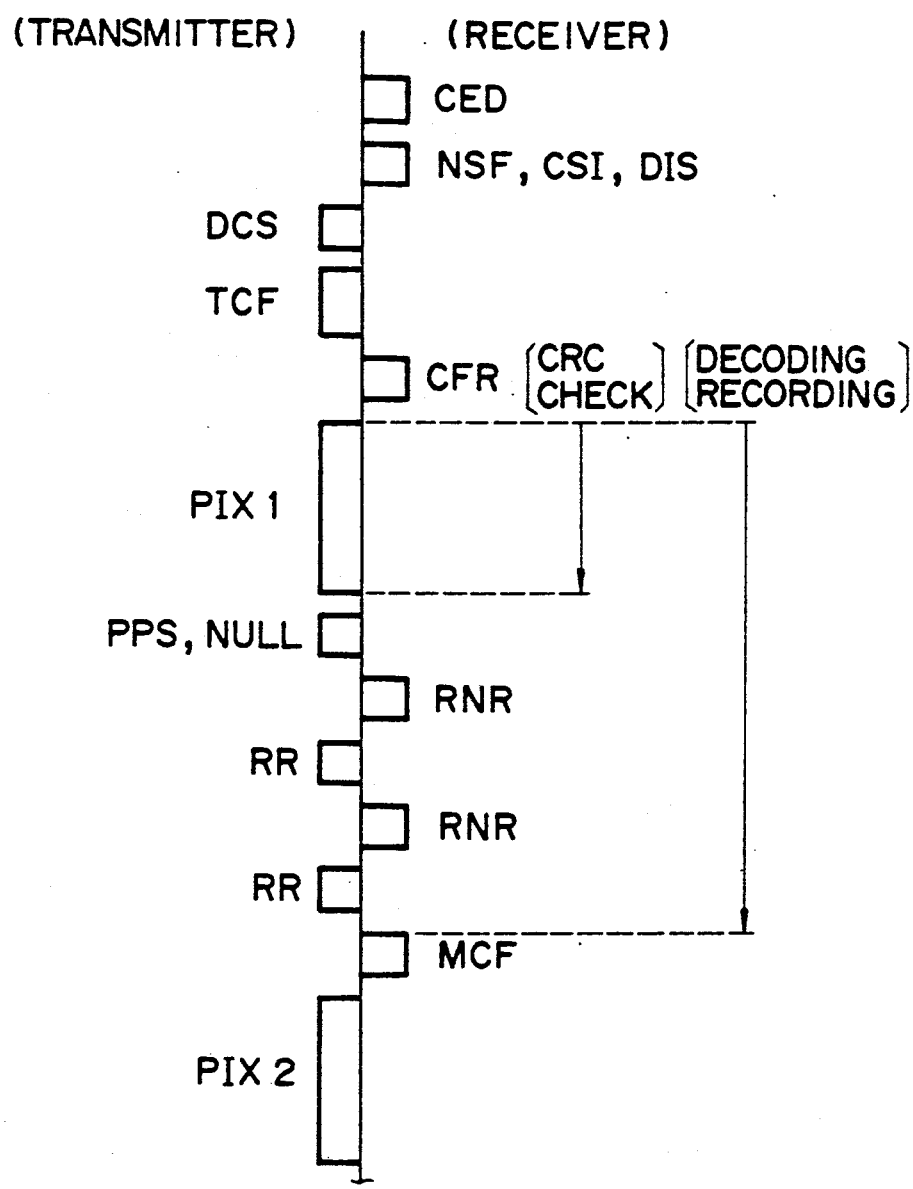
FIG. 8 is a timing chart illustrating a sequence of steps in a typical prior art error correction mode.

When transmitting image information in such an error correction mode, a transmission buffer for temporarily storing image information to be transmitted is required. Conventionally, since the capacity of such a transmission buffer was set to the size capable of storing one block of image information, the following disadvantages were present. For example, consider the case in which one page of image information is too large for one block and thus extends between two consecutive blocks and thus the image information is transmitted according to a procedure shown in FIG. 8.

With an original to be transmitted set in the transmitting facsimile machine, when the operator inputs the address information of a destination station and initiates transmission, the transmitting facsimile machine places a call to the receiving facsimile machine of the destination station. Upon receipt of the call, the receiving facsimile machine sends a signal CED, which indicates itself to be a non-vocal terminal, and then apprises the transmitting facsimile machine of its standard function, optional function and its identification information by way of respective signals DIS, NSF and CSI. Then, the transmitting facsimile machine apprises the receiving facsimile machine of functions to be used by way of a signal DCS and then carries out training check TCF. If the result of training is good, the receiving facsimile machine sends a signal CFR to the transmitting facsimile machine so that the transmitting facsimile machine forms the first block of image information PIX1 of the original, which is then temporarily stored in the transmission buffer and transmitted to the receiving facsimile machine.

Upon completion of transmission of the image information PIX1, a signal PPS.NULL is transmitted to indicate the presence of the next following block of the same page. The receiving facsimile machine stores the received image information PIX1 in the transmission buffer and inspects the error detection code FCS to check whether or not data errors have occurred in each of the data frames and then decodes the received image information PIX1 to restore the original image information for use in recording. Upon completion of reception of the signal PPS.NULL, the reception of one block of image information is completed and the presence of the following block of the same page is detected. If a decoding process of the image information PIX1 has not been completed at that time and if it is determined that no data errors have occurred in all of the data frames, a signal RNR is transmitted to the transmitting facsimile machine.

Upon receipt of the signal RNR, the transmitting facsimile machine transmits a signal RR without processing the next following block of image information PIX2. Before the decoding process is completed, the receiving facsimile machine sends a signal RNR in response to the signal RR and a signal MCF, which indicates safe receipt of a message, at the time when the signal RR has been received after completion of the decoding process. Thus, the transmitting facsimile machine initiates the transmission of the next block of image information PIX2. In this manner, a so-called flow control is carried out to halt the transmission of the image information of the next block or next page until the decoding process of the receiving facsimile machine is completed. However, when this flow control is carried out, the transmission time for transmitting the image information is prolonged and thus the communication efficiency deteriorates. Next, a still further aspect of the present invention which is capable of obviating such disadvantages will be described.

Figure 9:
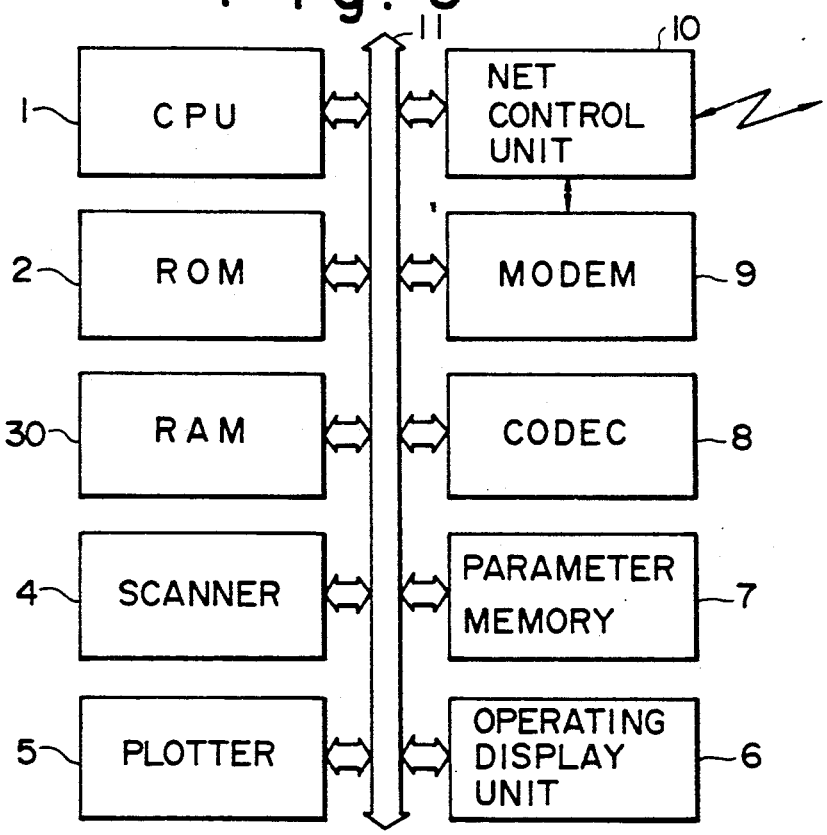
FIG. 9 is a block diagram showing the overall structure of a facsimile machine constructed in accordance with a further embodiment of the present invention.
Figure 10:
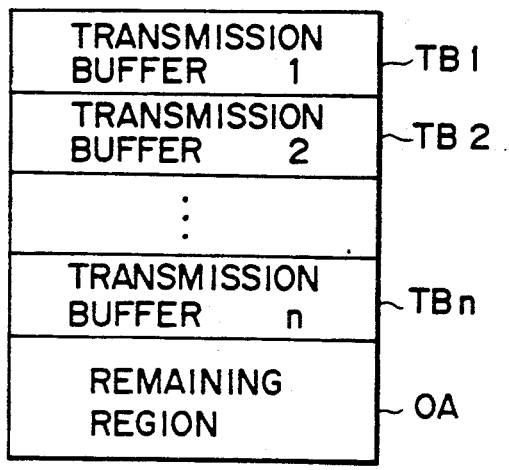
FIG. 10 is an illustration showing an example of defining memory regions in the RAM provided in the facsimile machine of FIG. 9.

FIG. 9 illustrates a facsimile machine constructed in accordance with a still further embodiment of this aspect of the present invention. It is to be noted that those elements which are similar to those elements shown in FIG. 1 will be indicated by similar numerals. In the present embodiment, however, the auxiliary equalizer 9a of the MODEM 9 is normally disconnected. In the structure of FIG. 9, a RAM 30 can define n plurality of transmission buffers, each having the capacity of 64K bytes. In addition, as shown in FIG. 10, a region OA, for example, for use as a work area may also be defined in the RAM 30.

Figure 11:
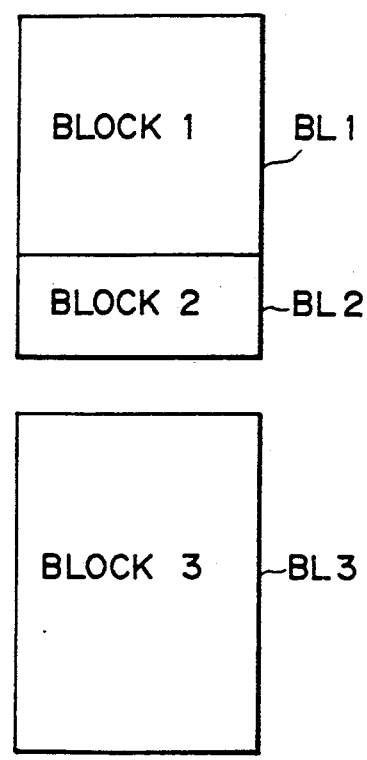
FIG. 11 is an illustration showing an example of originals to be transmitted.
Figure 12:
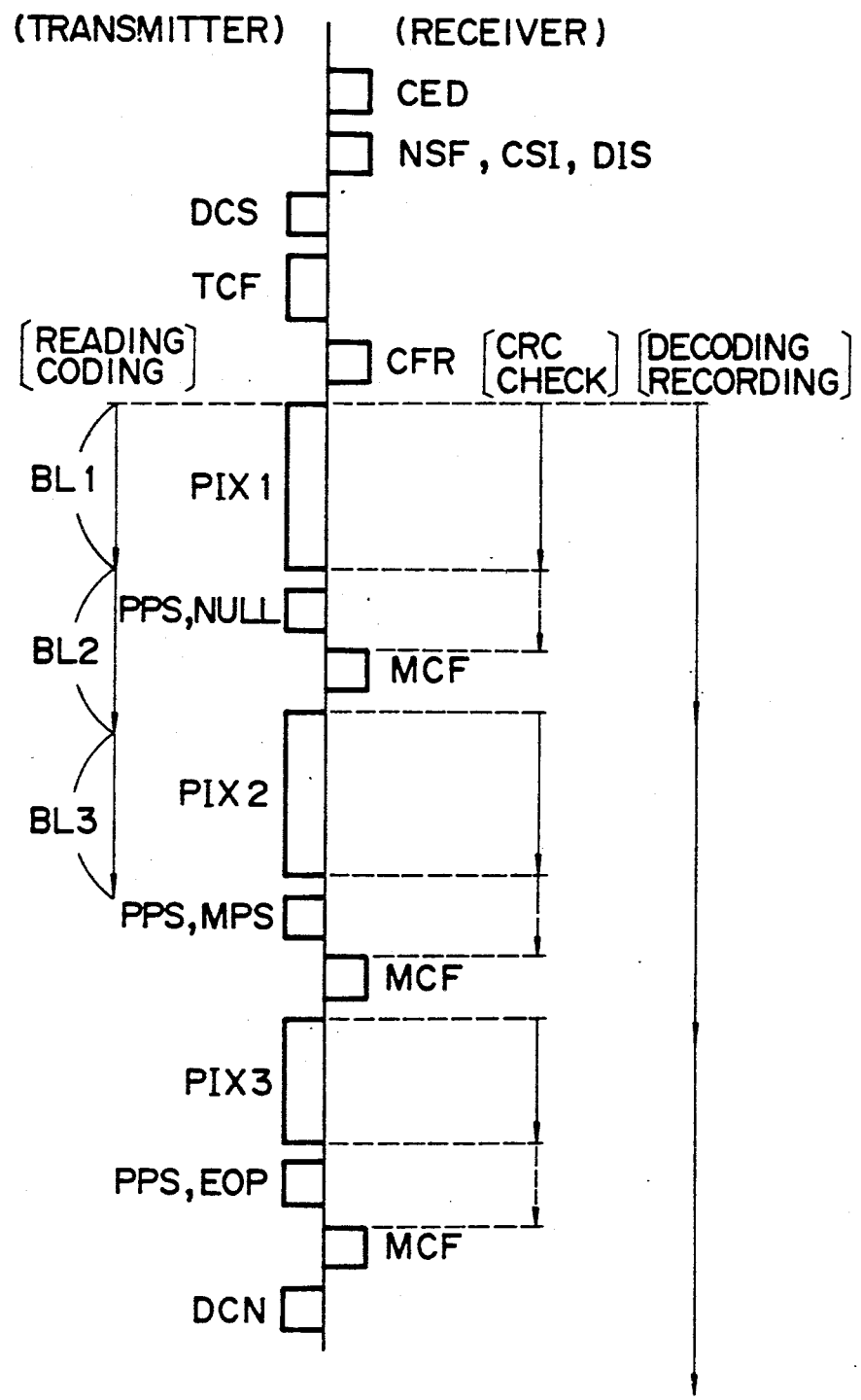
FIG. 12 is a timing chart showing one example of a transmission procedure in the facsimile machine of FIG. 9.
Figure 13A:
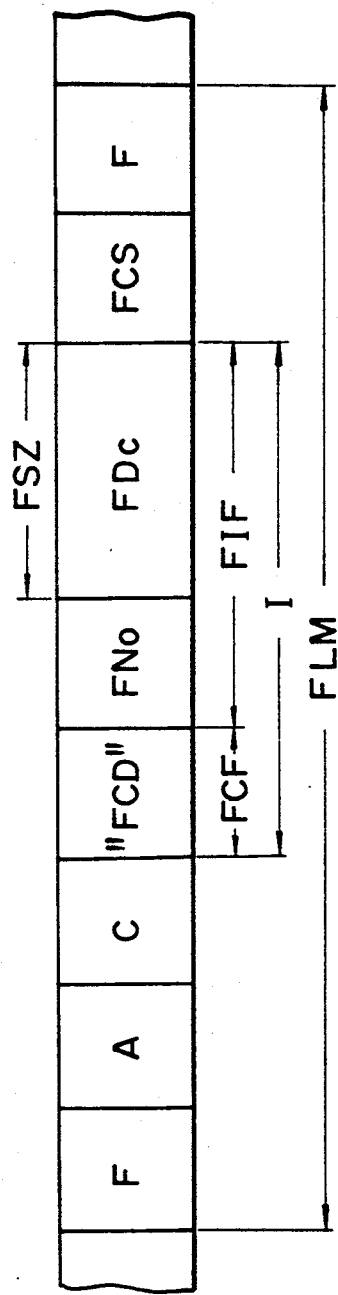
FIG. 13a is an illustration showing a frame format for transmitting image information in the form of frames.
Figure 13B:
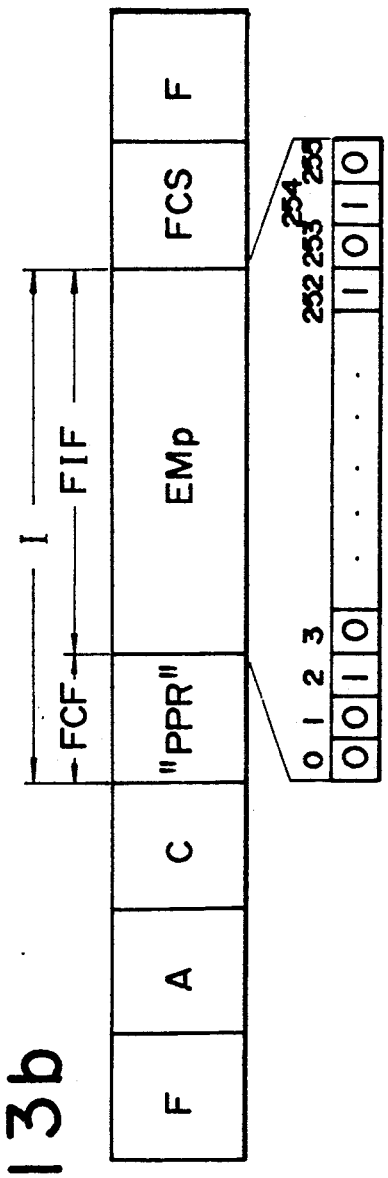
FIG. 13b is an illustration showing a frame format of a signal PPR.

With this structure, for example, as shown in FIG. 11, let us consider the case of two originals to be transmitted in which one page of image information has a size on the order of 200K bytes and it is divided into two blocks BL1 and BL2 with the second page of image information defining one block BL3. It is to be noted that in the following description the facsimile machine shown in FIG. 9 will be used for both of transmitting and receiving facsimile machines.

With two pages of originals set in the scanner 4 of the transmitting facsimile machine, when the operator operates the operation/display unit 6 to input the address information of a destination station and to initiate a transmission operation, the transmitting facsimile machine places a call to the receiving facsimile machine. Upon receipt of the call, the receiving facsimile machine sends a signal CED, which indicates the receiving facsimile machine to be a non-vocal terminal, and then apprises the transmitting facsimile machine of its standard function, an optical function, and its identification information by way of signals DIS, NSF and CSI, respectively. Then, the transmitting facsimile machine apprises the receiving facsimile machine of functions to be used by way of a signal DCS and carries out training check TCF. If the result of the training is good, the receiving facsimile machine sends a signal CFR to the transmitting facsimile machine, by which the transmitting facsimile machine initiates transmission of the first block BL1 of the first page of image information PIX1.

In this instance, the transmitting facsimile machine reads the image of the original to be transmitted by the scanner 4 and the image signal thus obtained is compressed by coding by the codec 8. Then, the resulting compressed image information is arranged in the form of the above-described frame data and the frame data is stored in the transmission buffer TB1 defined in the RAM 30. Then, the frame data stored in the transmission buffer TB1 is transferred to the MODEM 9 and the thus modulated image information is transmitted to the receiving facsimile machine via the net control unit 10. In this manner, upon completion of transmission of the first block BL1 of the first page of image information PIX1, a signal PPS.NULL is transmitted to apprise the receiving facsimile machine of the presence of the following block for the same page of image information. Then, reading and coding of the following block BL2 of the first page is initiated and the resulting image information PIX2 is stored into the transmission buffer TB2 defined in the RAM 30.

On the other hand, the receiving facsimile machine stores the received image information PIX1 in the transmission buffer TB1 defined in the RAM 30 and inspects the error detection code FCS to determine whether or not any data errors have occurred in each of the data frames. Then, after decoding the received image information PIX1 by the codec 8, the restored original image information is used for recording by the plotter 5. The determination of the presence of data errors of the data frames by the receiving facsimile machine is all completed immediately prior to completion of reception of image information PIX1, and after this determination step, the receiving facsimile machine enters a stand-by mode for waiting the arrival of a signal after the message from the transmitting facsimile machine. In this case, if it has been determined that no data errors have occurred in any of the data frames, the receiving facsimile machine sends a signal MCF upon receipt of a signal PPS.NULL from the transmitting facsimile machine.

Upon receipt of the signal MCF, the transmitting facsimile machine transmits the next block BL2 of image information PIX2 to the receiving facsimile machine in a manner similar to that described above. Upon completion of reading the image of the first page, the transmitting facsimile machine initiates reading the image of the second page to thereby form a block BL3 of image information PIX3, which is then stored in a transmission buffer TB3 defined inthe RAM 30. Upon receipt of the next block BL2 of image information PIX2, the receiving facsimile machine stores it in the transmission buffer TB2 defined in the RAM 30 and inspects errors in the data frames in a manner similar to that described above. The receiving facsimile machine executes decoding and recording processes of the first blcok BL1 in parallel with a reception process and initiates decoding and recording processes of the block BL2 upon completion of recording of the image of the block BL1. When the transmission of image information PIX2 is completed, the transmitting facsimile machine sends a signal PPS.MPS which indicates the presence of the following page.

Immediately after the receipt of image information PIX2, the receiving facsimile machine completes an error detecting process of data frames and waits to receive a signal after the message. Then, when a signal PPS.MPS has been received, if all of the data, frames have been received without errors, the receiving facsimile machine sends a signal MCF to the transmitting facsimile machine. Upon receipt of a signal MCF, the transmitting facsimile machine transmits the block BL3 of the second page of image information PIX3 to the receiving facsimile machine in a manner similar to that described above, and upon completion of transmission, the transmitting facsimile machine sends a signal PPS.EOP which indicates the end of transmission. In a manner similar to that described above, the receiving facsimile machine stores the received image information PIX3 in the transmission buffer TB3 defined inthe RAM 30 and inspects the presence of errors in the data frames. The inspection of the presence of errors in the data frames is completed immediately after the completion of reception of image information PIX3, and if all of the data frames have been received without errors at that time, the receiving facsimile machine transmits a signal MCF to the transmitting facsimile machine at the time of receipt of the signal PPS.EOP.

Upon receipt of the signal MCF, the transmitting facsimile machine transmits a signal DCN and has the transmission line disconnected to thereby terminate the image information transmission operation. Upon completion of recording of the first page of received image information, the receiving facsimile machine carries out decoding and recording processes of image information PIX3, whereby the second page of image information is recorded by the plotter 5. And, at the time of receipt of signal DCN, the transmission line is disconnected to terminate the reception operation.

In this manner, in the transmitting facsimile machine, reading of an original and storing of the original image information can be carried out in parallel with a transmission process of image information; whereas, in the receiving facsimile machine, a receiving process of image information can be carried out in parallel with decoding and recording processes. Thus, the time required for transmission of image information can be shortened significantly and the communication efficiency can be enhanced remarkably.

In the above-described examples of image information transmission, only one embodiment of the present invention has been used in both of the transmitting and receiving facsimile machines. However, the similar advantages can be obtained even if the case in which one embodiment of the present invention is used only in either one of the transmitting and receiving facsimile machines. Besides, in the above-described examples of image information transmission, no transmission errors have occurred in image information. An enhanced transmission efficiency can also be obtained even in the case in which retransmission has been carried out due to occurrence of transmission errors in the transmitted image information.

As described above, in accordance with the present invention, there is provided an auxiliary equalizer for compensating a high frequency characteristic of a communication network and the use or non-use of the auxiliary equalizer is determined at least in either one of the transmitter or receiver and the characteristic of the auxiliary equalizer is altered depending on the condition for retransmission. Thus, the network characteristic is suitably adjusted depending on the retransmission condition to reduce the transmission error rate. As a result, since the frequency of a request for retransmission decreases even if the transmission speed is not lowered, there can be obtained an enhanced transmission efficiency.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A facsimile transmission system provided with a retransmission of data upon detection of an error, said system comprising:

a transmitting station including means for dividing one page of image information into a plurality of frames, and first means for transmitting said frames on a block-by-block basis, each block including a predetermined number of frames;

a receiving station receiving said transmitted frames and including means for checking said frames for errors and second means for transmitting an indication of the presence of errors to the transmitting station;

said first means for transmitting retransmitting the frame data in response to said second means for transmitting when an error is found at the receiving station;

said transmitting station also including a plurality of transmission buffers connected between said means for dividing and said first means for transmitting, with each buffer being capable of storing one block of image information, so that while a first block of information is being transmitted from one buffer, the next image information is encoded and stored in another buffer.

2. A facsimile transmission method having a retransmission of data upon detection of an error, comprising the steps of:

dividing one page of image information into a plurality of frames;

transmitting said frames on a block-by-block basis, with each block including a predetermined number of frames;

receiving said frames at a receiving station;

checking said frames for errors;

indicating that an error is present;

retransmitting the frame data of the frames having transmission errors, as indicated;

transmitting the next information if no transmission error has been indicated;

providing a plurality of buffers so that a first transmitted information can be subjected to decoding and recording from a first buffer while the next information is being received and stored in a second buffer.

* * * * *